United States Patent [19]
Collins

[11] 3,909,172
[45] Sept. 30, 1975

[54] ELECTRICAL CONTROL OF MACHINES

[75] Inventor: George Thomas Collins, Sutton Coldfield, England

[73] Assignee: British Industrial Plastics Limited, Manchester, England

[22] Filed: Feb. 8, 1972

[21] Appl. No.: 224,531

Related U.S. Application Data

[63] Continuation of Ser. No. 6,720, Jan. 29, 1970, abandoned.

[30] Foreign Application Priority Data
Jan. 27, 1969   United Kingdom.................. 4895/69

[52] U.S. Cl.................................. 425/162; 164/154
[51] Int. Cl.² ............................................ B29F 1/00
[58] Field of Search ............ 425/135, 162; 164/154; 235/151.3, 152

[56] References Cited
UNITED STATES PATENTS

| | | | |
|---|---|---|---|
| 3,036,222 | 5/1962 | Witt................................ | 235/152 X |
| 3,525,382 | 8/1970 | Devol................................ | 164/154 |

OTHER PUBLICATIONS

*Automation*, February 1963, TJ212.A9, pp. 78–82.

*Modern Plastics*, October 1968, TP986.A1M6, pp. 122–124 & 126.

Primary Examiner—R. Spencer Annear
Attorney, Agent, or Firm—Baldwin, Wight & Brown

[57] ABSTRACT

An electrical control console for controlling operating sequences in an automated machine, the console including a rack of printed circuit cards wherein each card controls one or more operating sequences in a process performed by said machine. The invention is particularly suitable for controlling a sequence of operations performed by an injection moulding machine wherein failure to perform correctly any sequence may be checked out by removing and testing the appropriate printed circuit card.

2 Claims, 6 Drawing Figures

ELECTRICAL CONTROL OF MACHINES

This is a continuation of application Ser. No. 6,720, filed Jan. 29, 1970, now abandoned.

This invention relates to the electrical control of machines, and is especially concerned with providing a control system for a machine which is capable of carrying out a number of actions.

The operation of any machine normally involves a number of individual actions which are carried out in a predetermined sequence. For example, the operation of a screw type injection moulding machine for moulding thermoplastics or thermosetting materials involves the opening and closing of mould halves, the plasticizing of the material in the barrel of the machine, the rotary and reciprocatory movement of a feed screw, the heating and cooling of the barrel, the heating or cooling of the mould, the cooling of the screw, the movement of the barrel, the ejection of the moulded article, and so on, the mechanical operations all in strict sequence. Not all of these individual actions are required in each case, but the particular actions and the sequence thereof for each individual material and each particular moulding operation will be known in each case.

It is known to control machines such as injection moulding machines electrically, and hitherto control systems have been built up by first of all determining which particular actions the machine is required to perform and in what sequence, and then constructing a circuit which will bring about the performance of these actions in the required sequence. Such circuits may comprise the normal electronic equipment, e.g., switching blocks, timing blocks, filters, amplifiers and relays etc., and it is usual to construct the circuit so that all the filters are together, all the timing blocks are together, all the switching blocks are together, and so on. We have found that this can be disadvantageous. For example, if, once the control circuit has been constructed, the machine is required to perform an extra action or to omit an action already included in its operating sequence, it is necessary to re-construct the whole circuit. Secondly, if a fault should develop in any part of the machine it is necessary to check the entire circuit in order to ascertain the cause of the fault and remedy it.

The present invention provides a control system for a machine, e.g. a moulding machine, which enables the machine to perform any desired number of actions, which number may be reduced or supplemented rapidly and easily at will, and which enables any fault which occurs to be rectified immediately.

According to the present invention an electrical control system for a machine capable of carrying out a plurality of actions comprises a plurality of printed circuit cards, each card carrying the necessary electrical components for controlling one or more of said actions.

An example of the invention is described with reference to the accompanying drawings in which;

FIG. 1 schematically illustrates an injection moulding machine,

Figure 1:
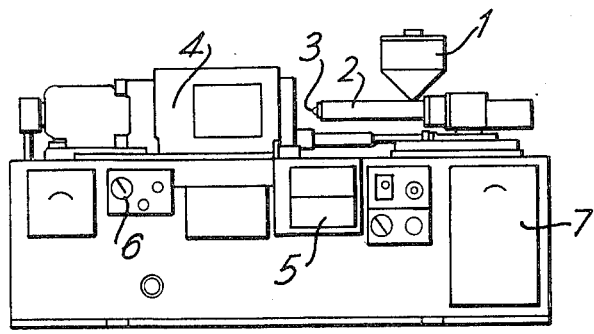

The injection moulding machine as shown in FIG. 1 may be used for moulding thermoplastics materials in a split mould having, for example, separable platens or dies. Thermoplastics material is contained in a hopper 1 which feeds a heated screw injection cylinder 2 having an outlet nozzle 3. The screw 2 is driven by hydraulic motors not shown. An assembly 4 houses a separable mould comprising, for example, a fixed platen with an inlet cooperating with the injection nozzle 3, and a reciprocable hydraulic ram operated platen. Manual controls 5 and indicators 6 are shown at the front of the injection moulding machine, and a compartment 7 houses solenoid valves controlling various operations in the injection moulding process. The injection moulding machine requires only brief description as its construction and operation will be known to those skilled in the art.

Figure 2:
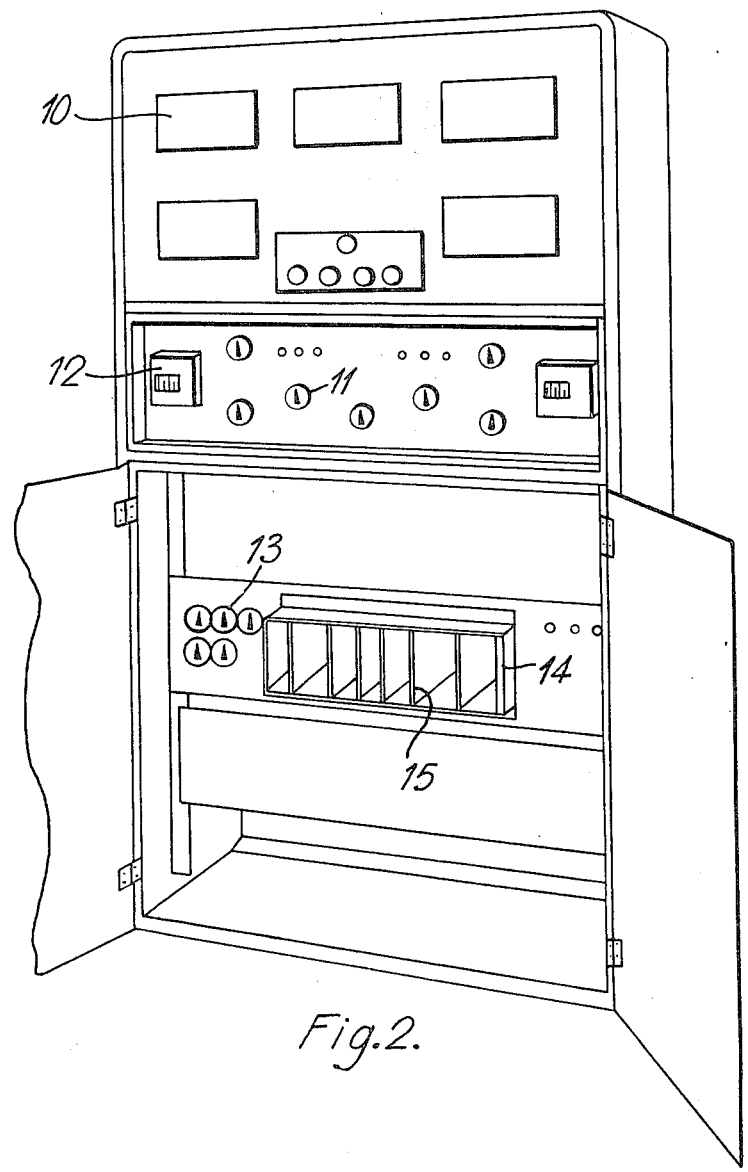
FIG. 2 is a perspective view of a control console.

A control console is shown in FIG. 2 which generally comprises injection cylinder temperature controllers having dials 10, sequence selector switches 11, digital setting timers 12, settable time delay controls 13 and a rack 14 housing a plurality of printed circuit boards or cards 15.

The printed circuit cards 15 are removably located in the rack 14 by means of, for example, edge connectors. Each printed circuit card 15 contains the necessary circuit components, for example, filters, logical elements, resistors and capacitors, amplifiers, and the like, for controlling a particular operation in a sequence of steps forming an injection moulding process. For example, a first card controls the movement of the mould halves, a second card controls the injection feed screw, a third card controls the ejection of a moulded article, and so on. If desired, more than one action may be controlled by a single card. For example, both the opening and the closing movements of the mould halves may be controlled by one card.

Figure 3:
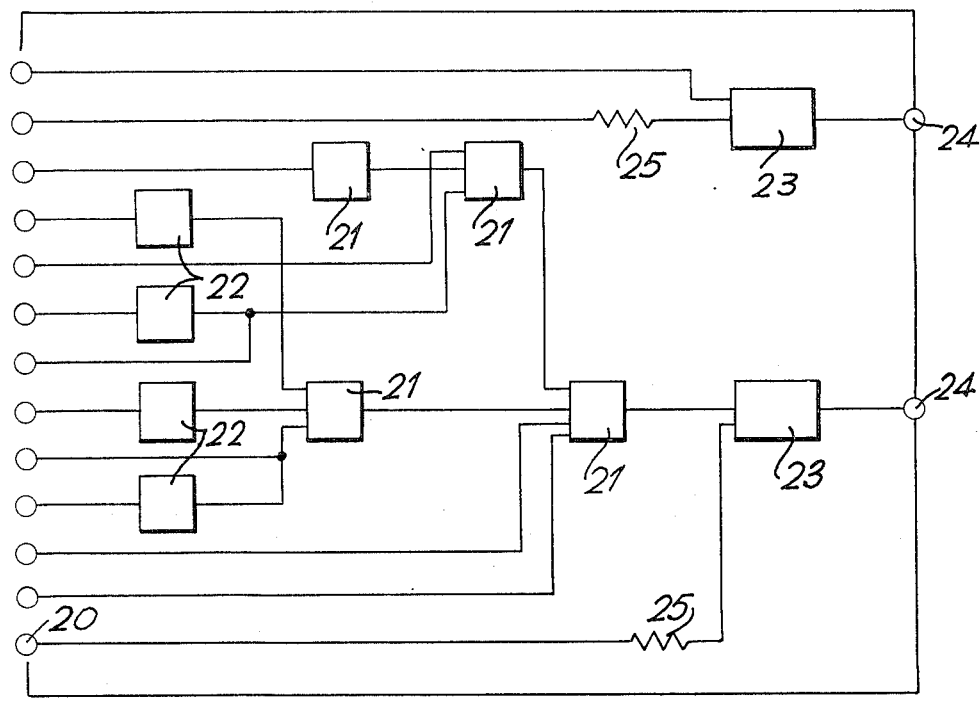
FIGS. 3 – 5 are circuit diagrams illustrating the components and layout of components on a printed circuit card.
Figure 4:
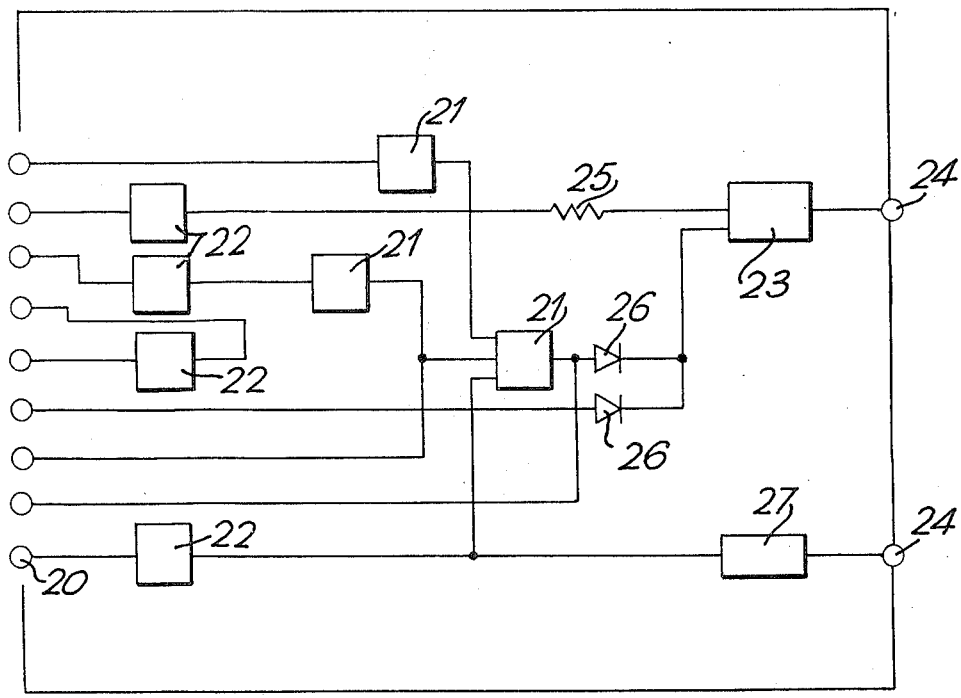
Figure 5:
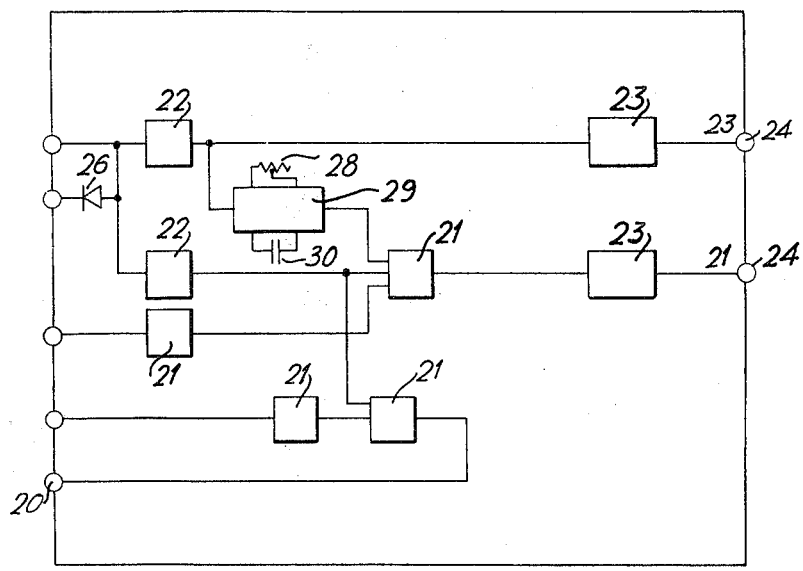

FIGS. 3 – 5 are schematic circuit diagrams showing the components and a suitable layout of the same for controlling a particular sequence in an injection moulding process. In FIG. 3 a row of edge connectors 20 are respectively connected to components including NOR logical elements 21, filters 22, power amplifiers 23 connected to output terminals 24, and resistors 25. Circuit connections are made by printed circuit techniques. The card of FIG. 3 is provided for controlling the opening and closing of the mould halves, namely the fixed and movable platens. The inputs 20 are connected both to transducers sensing the movement, for example, of the hydraulically operated platen, and to other printed circuit cards. Connection is also made to earth and potential supplies. The outputs 24 are connected to corresponding solenoid valves, for example to platen pressure control, and platen forward and reverse, solenoid valves.

Similarly, the circuit of FIG. 4 includes like components identified by like reference numerals in addition to diodes 26 and an amplifier 27. The card shown is for controlling an injection plunger, the inputs 20 being connected to transducers, other cards, earth and power supplies, and the outputs being connected respectively to a plunger solenoid valve and a plunger timer.

The card shown in FIG. 5 is for controlling an hydraulic motor for the screw injection cylinder 2 of FIG. 1. Like reference numerals identify like component parts and in addition reference numeral 28 identifies a variable resistance for setting a timing unit 29, and reference numeral 30 identifies a capacitor. Inputs 20 are connected to transducers, other cards, earth and power supplies and outputs 24 are connected to hydraulic motor feed screw drive, and feed screw decompression, solenoid valves respectively.

Figure 6:
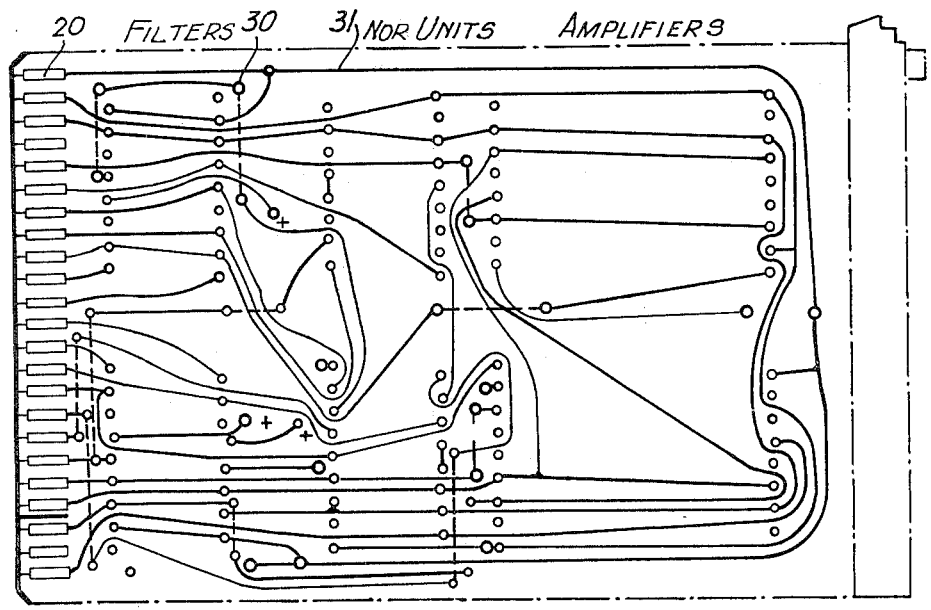
FIG. 6 illustrates a typical printed circuit of the card shown in FIG. 3.

FIG. 6 shows a typical printed circuit, for example, of the card schematically illustrated in FIG. 3. It will be appreciated that integrated circuit components such as logical elements and power amplifiers are located on the obverse side of the printed circuit, terminals passing through appropriate holes 30 for connection to conductors 31.

The printed circuit cards 15 are preferably locatable in parallel vertical alignment in the rack 14 shown in FIG. 2. The rack 14 houses those cards controlling various actions which it is desired that the injection moulding machine of FIG. 1 shall perform. Each circuit on a printed circuit card causes solenoid valves or pneumatic valves to control hydraulic valves operating the injection moulding machine. Each card allows a particular sequence to operate with the required timing. Certain variations in the control of the injection moulding machine may be effected by the temperature controllers (of which the dials 10 are illustrated), the sequence selector switches 11 and digital setting timers 12, and the settable time delays 13 shown in the console illustrated in FIG. 2. The construction and operation of such controls will be known to those skilled in the art.

The invention enables an injection moulding machine, such as that shown in FIG. 1, to be used for a variety of purposes. Thus, an injection moulding machine supplied for the purpose of thermosetting materials may be modified very rapidly for the moulding of thermoplastics materials simply by removing from the control system those cards controlling actions unique to the moulding of thermosetting materials and replacing them with cards controlling actions which are required in the moulding of thermoplastics materials. For example, in moulding thermosetting materials, an action termed "pre-pack" is required, and the control system will include a card enabling this action to take place. This action is not required for the moulding of thermoplastic materials, but another action, known as "decompression", is required. Thus, when modifying the machine from one on which thermosetting materials are to be moulded to one on which thermoplastics materials are to be moulded, the "pre-pack" card would be removed and replaced with the "decompression" card.

It will be appreciated that the main control console for the machine will be wired for all possible actions which the machine may be required to perform. The control system of the invention, by virtue of its use of certain circuit cards in combination, simply selects which of all possible actions are to be performed in any one case and the order and timing of the actions. Thus, in the example mentioned above, the main console would be wired for both "pre-pack" and "decompression" actions.

The following is a list of printed circuit control cards which may be supplied with an injection moulding machine, showing the action which is brought about by the presence of each in the system:

| | |
|---|---|
| 1 | Stop, Reset. |
| 2 | Double load safety. |
| 3 | Cycle start and recycling. |
| 4 | Ejection. |
| 5 | Ejection sequences.<br>(i) Standard (ii) Immediate return<br>(iii) Double Stroke (iv) With stripper. |
| 5A | As 5 but (iii) repetitive stroke. |
| 6 | Mould halves. |
| 7 | Cores. |
| 8 | Slow open and slow close. |
| 9 | Plunger. |
| 10 | Plunger pressure reduction. |
| 11 | Hydraulic motor and decompression. |
| 11A | Hydraulic motor and pre-pack. |
| 12 | Carriage. |
| 13 & 14 | Alarms (13-nozzle heat failure.<br>14-failure to inject.) |
| 15 | Plunger speed and 2nd pressure reduction. |
| 16 | Pump unload. Cores out with dies pressure off. |

The basic machine will normally have cards 1–4, 6, 8–12, 15 and 16. The other cards will be optional, depending upon the requirements for the machine.

Due to the fact that each action of the machine is controlled by a single card, it is a simple matter to rectify any faults which may occur. For example, if the mould halves fail to open or close there may be a fault in the mould open-and-close card. This may be tested and if it is found faulty should be removed and replaced with a fault-free card.

Individual printed circuit cards 15 may be tested by suitable equipment described and illustrated in our copending application, entitled "Printed Circuit Card Test Unit".

What we claim is:

1. In an injection moulding machine having hydraulically controlled parts for performing a plurality $m$ of possible injection moulding actions, a main control console wired for all $m$ possible actions which the machine may be required to perform, and transducer means for producing output signals in response to the performance of said actions, the improvement comprising the combination of control means for selecting different combinations of said $m$ possible actions wherein each combination involves a number of actions less than $m$ and for controlling the order and timing of such selected combination of actions; said control means comprising:

rack means for removably receiving different combinations of printed circuit cards, said rack means including separate sets of edge connectors associated with the different actions to be performed, each set being adapted to connect with an individual printed circuit card and each set including input and output connectors connected to said main control console and to said transducer means through the associated individual printed circuit card to perform a different one of said plurality $m$ of possible injection moulding actions; and a plurality $n$ of printed circuit cards connected with a selected number $n$ of said individual sets of said edge connectors, the number $n$ being less than $m$ and corresponding to the number of actions involved in a selected one of said different combinations of said $m$ possible actions each printed circuit card including circuit means for controlling the timing of a certain one of said $n$ actions, and said printed circuit cards being connected to those $n$ corresponding sets of said edge connector which will effect the combination, order and timing of said selected $n$ actions.

2. In an injection moulding machine as defined in claim 1 wherein said control means also includes means on said main control console for adjusting the action effected by individual printed circuit cards within predetermined limits.

\* \* \* \* \*